United States Patent
Bell

[11] Patent Number: 6,027,423
[45] Date of Patent: Feb. 22, 2000

[54] ARRANGEMENT FOR MOUNTING A PINION GEAR WITHIN A HOUSING OF A DIFFERENTIAL ASSEMBLY

[75] Inventor: Douglas W. Bell, Mattoon, Ill.

[73] Assignee: Caterpillar Inc., Peoria, Ill.

[21] Appl. No.: 09/162,031

[22] Filed: Sep. 28, 1998

[51] Int. Cl.[7] ............................................. F16H 48/06
[52] U.S. Cl. ........................ 475/246; 475/230; 475/348
[58] Field of Search ............................ 475/246, 247, 475/253, 348; 384/540, 585

[56] References Cited

U.S. PATENT DOCUMENTS

| | | | |
|---|---|---|---|
| 578,211 | 3/1897 | Clark | 24/599.9 X |
| 2,680,972 | 6/1954 | Tone | 475/247 X |
| 2,771,791 | 11/1956 | Bachman | 475/247 X |
| 2,774,253 | 12/1956 | Minard et al. | 475/247 X |
| 2,911,855 | 11/1959 | Opocensky | 475/247 |
| 3,779,102 | 12/1973 | Pfarrwaller | 475/246 X |
| 3,872,741 | 3/1975 | Berchtold et al. | 475/246 |
| 3,949,626 | 4/1976 | Berlinger et al. | 475/9 X |
| 3,986,414 | 10/1976 | Peterson et al. | 475/217 |
| 4,011,670 | 3/1977 | Hutchings et al. | 384/583 X |
| 4,076,433 | 2/1978 | Halopoff | 411/389 X |
| 4,163,400 | 8/1979 | Fisher et al. | 475/230 |
| 4,248,105 | 2/1981 | Downing et al. | 475/233 X |
| 4,273,006 | 6/1981 | Woodbury | 475/233 X |
| 4,289,047 | 9/1981 | Hopkins | 475/246 |
| 4,294,218 | 10/1981 | King et al. | 475/9 X |
| 4,304,317 | 12/1981 | Vanzant et al. | 475/230 X |
| 4,557,157 | 12/1985 | Oestmann | 475/6 X |
| 4,611,505 | 9/1986 | Cronin et al. | 475/6 |
| 4,613,240 | 9/1986 | Hagelthorn | 384/585 |
| 5,147,144 | 9/1992 | Kasai | 384/585 X |
| 5,234,388 | 8/1993 | Nordkvist | 475/246 |
| 5,795,037 | 8/1998 | Hagelthorn | 384/562 X |

OTHER PUBLICATIONS

Japanese Utility Model Publication U.M. Publication No. Sho 62–7880, Publication Date: Feb. 24, 1987.

*Primary Examiner*—Charles A. Marmor
*Assistant Examiner*—Scott Lund
*Attorney, Agent, or Firm*—W. Bryan McPherson III

[57] ABSTRACT

A differential assembly which includes a differential housing is disclosed. The differential assembly also includes a spider structure positioned within the differential housing. The spider structure has (i) a spider hub and (ii) a spider shaft which extends from the spider hub. The differential assembly further includes a pinion gear positioned around the spider shaft and a fastener secured to the spider shaft. The differential assembly also includes a bearing assembly which directly contacts the spider shaft, wherein the bearing assembly is (i) interposed between the pinion gear and the spider shaft and (ii) interposed between the fastener and the spider hub.

15 Claims, 3 Drawing Sheets

ARRANGEMENT FOR MOUNTING A PINION GEAR WITHIN A HOUSING OF A DIFFERENTIAL ASSEMBLY

TECHNICAL FIELD OF THE INVENTION

The present invention relates generally to a differential assembly, and more particularly to an arrangement for mounting a pinion gear within a housing of a differential assembly.

BACKGROUND OF THEIR INVENTION

Work machines, such as mining trucks, typically include a left axle, a right axle, and a differential assembly which mechanically couples the right and left axle. The differential assembly allows the right and left axles to rotate at different speeds relative to one another as the work machine is driven in a curved path.

The differential assembly typically includes a number of side gears and pinion gears enclosed in a differential housing. Each pinion gear is mounted on a roller bearing assembly, which is in turn mounted on a sleeve. The sleeve (with the roller bearing assembly and the pinion gear mounted thereon) is then disposed around a shaft of a spider structure. The spider structure is then positioned in, and secured to, the differential housing such that each pinion gear is positioned relative to a side gear so that the pinion gear meshes properly with the side gear.

A problem with the above described arrangement is that the position of the pinion gear relative to the side gear is determined by a relatively large number of mechanically coupled parts. For example, the positioning of the pinion gear relative to the side gear is determined to some degree by each of the following components; the differential housing, the spider structure, the roller bearing assembly, and the sleeve. As a result, the tolerances of each of the aforementioned components must be carefully controlled in order for the pinion gear to be positioned properly. Having to carefully control the tolerances of the aforementioned components increases the manufacturing cost of the differential assembly.

Another problem with the above described arrangement is that there is a limited amount of space available in the interior of the differential housing. As a result, the more components placed in the differential housing the smaller each component must be. For example, the above described arrangement requires the shaft of the spider structure to have a smaller circumference so the housing can accommodate the additional space taken up by the sleeve. The smaller spider structure shaft is more susceptible to cracking under the loads it is subjected to during the use of the work machine which increases maintenance costs of the work machine.

What is needed therefore is a differential assembly which overcomes one or more of the above-mentioned drawbacks.

DISCLOSURE OF THE INVENTION

In accordance with a first embodiment of the present invention, there is provided a differential assembly which includes a differential housing. The differential assembly also includes a spider structure positioned within the differential housing, wherein (i) the spider structure has a spider hub and a spider shaft, (ii) the spider shaft extends from the spider hub, and (iii) the spider shaft has a first threaded portion defined thereon. The differential assembly further includes a pinion gear positioned around the spider shaft.

The differential assembly also includes a fastener having a second threaded portion which cooperates with the first threaded portion of the spider shaft so as to secure the fastener to the spider shaft. The differential assembly further includes a bearing assembly which is (i) interposed between the pinion gear and the spider shaft and (ii) interposed between the fastener and the spider hub.

In accordance with a second embodiment of the present invention, there is provided a differential assembly which includes a differential housing. The differential assembly also includes a spider structure positioned within the differential housing. The spider structure has (i) a spider hub and (ii) a spider shaft which extends from the spider hub. The differential assembly further includes a pinion gear positioned around the spider shaft and a fastener secured to the spider shaft. The differential assembly also includes a bearing assembly which directly contacts the spider shaft, wherein the bearing assembly is (i) interposed between the pinion gear and the spider shaft and (ii) interposed between the fastener and the spider hub.

BEST MODE FOR CARRYING OUT THE INVENTION

Figure 1:
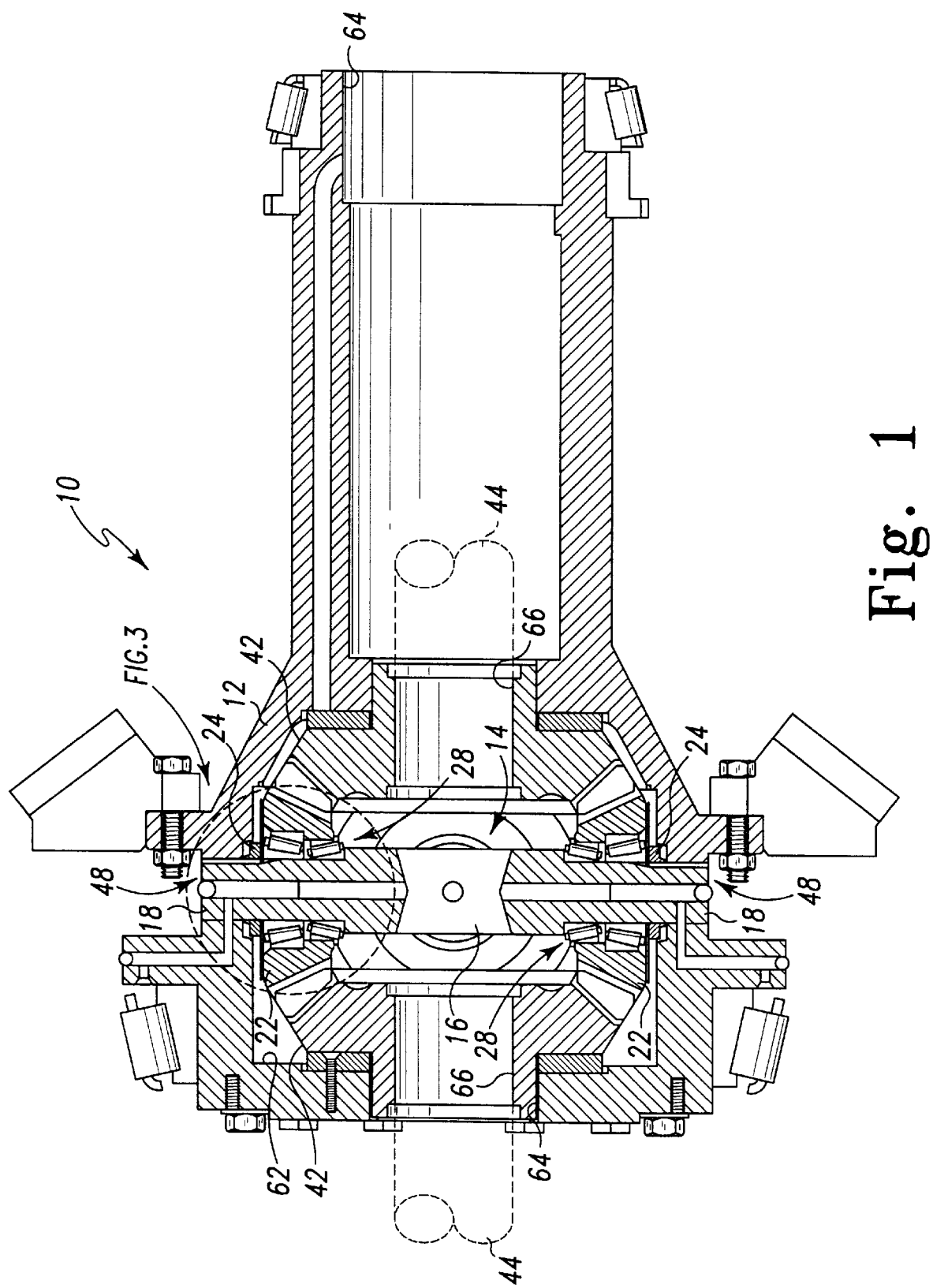
FIG. 1 is a cross sectional view of a differential assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a differential assembly 10 for use in a work machine (not shown) such as a mining truck. Differential assembly 10 includes a differential housing 12, a spider structure 14, pinion gears 22, fasteners 24, bearing assemblies 28, and washers 30 (see FIG. 3). The differential assembly 10 also includes a pair of side gears 42 and a pair of wheel axles 44.

Differential housing 12 defines an internal cavity 62. Differential housing also has a number of housing apertures 46 (see FIG. 3) and a pair of axle passageways 64 defined therein.

Each side gear 42 has an axle aperture 66 defined therein and is positioned in an opposing relationship within internal cavity 62 of differential housing 12. In addition, each side gear 66 is positioned within internal cavity 62 such that the axle apertures 66 defined in each side gear 42 are aligned with axle passageways 64. An end of one wheel axle 44 is positioned within the axle aperture 66 of each side gear 42 such that axle 44 is mechanically coupled to side gear 42 (e.g. via a spline coupling).

Figure 2:
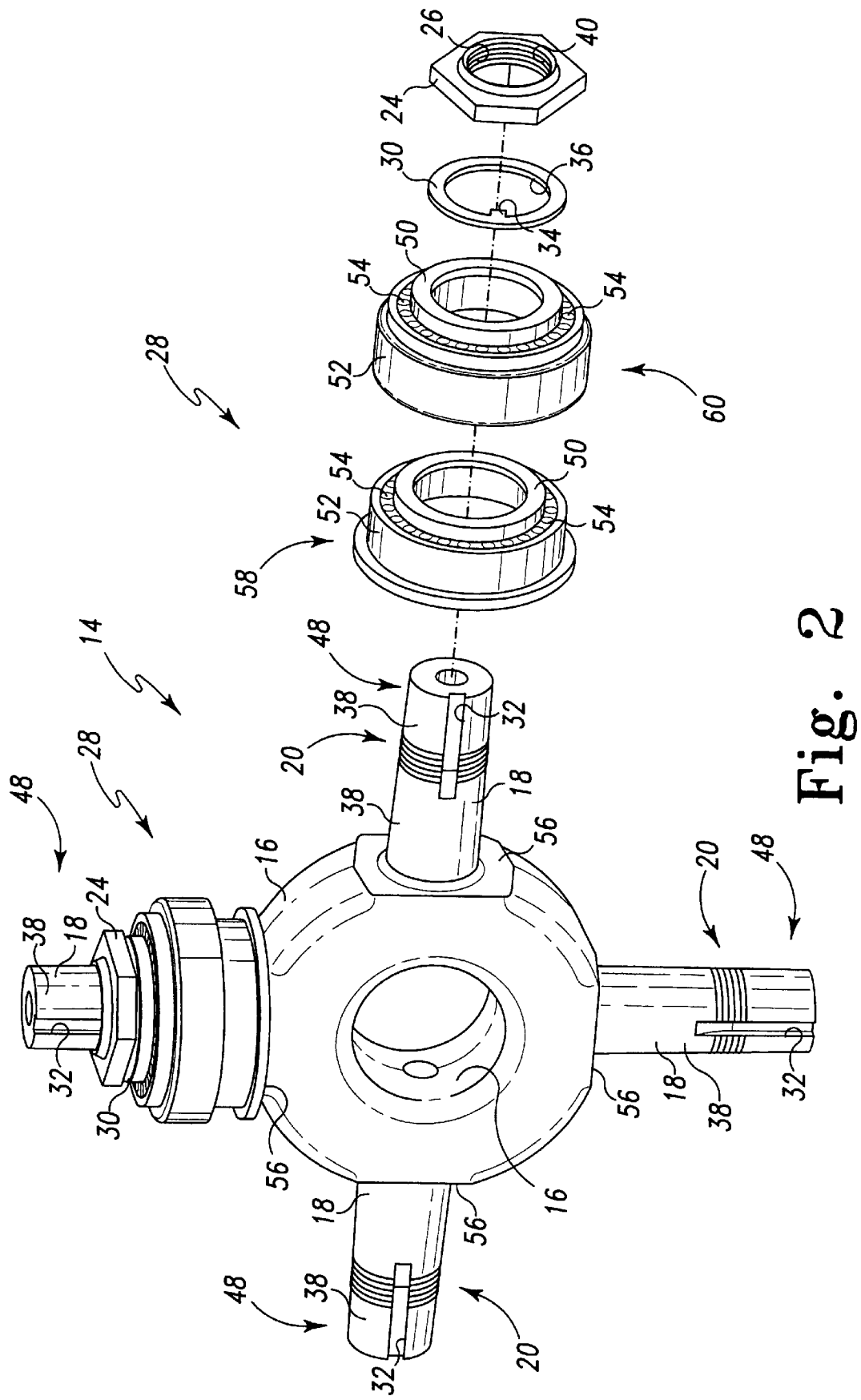
FIG. 2 is a perspective view of the spider structure and bearing assembly of FIG. 1 (note that one of the bearing assemblies is shown exploded for clarity of description)

As shown in FIG. 2, spider structure 14 includes a spider hub 16 having a number of shoulders 56 defined thereon and a plurality of spider shafts 18 extending therefrom. Each spider shaft 18 has a threaded portion 20 defined on an outer surface 38 thereof. Each spider shaft 18 also has a slot 32 defined therein.

Bearing assembly 28 includes a proximal bearing assembly 58 and a distal bearing assembly 60. As more clearly shown in FIG. 3, proximal bearing assembly 58 includes an inner bearing member 50 and an outer bearing member 52. Proximal bearing assembly 58 also includes a plurality of rollers 54 interposed between inner bearing member 50 and outer bearing member 52. Similarly, distal bearing assembly 60 includes an inner bearing member 50 and an outer bearing member 52 with a plurality of rollers 54 interposed between inner bearing member 50 and outer bearing member 52. One bearing assembly which can be used as bearing assembly 28 in the present invention is available from the Timken Corporation, located in Canton, Ohio, as catalogue number CAT-1564594.

Bearing assembly 28 is positioned relative to spider structure 14 such that bearing assembly 28 is (i) disposed around, and in direct contact with (see FIG. 3), spider shaft 18 and (ii) inner bearing member 50 of proximal bearing assembly 58 contacts shoulder 56 of spider hub 16. Only one bearing assembly 28 is shown disposed around spider shaft 18 in FIG. 2. However, it should be understood that once differential assembly 10 is fully assembled each spider shaft 18 has a bearing assembly 28 disposed therearound in the above described manner.

Figure 3:
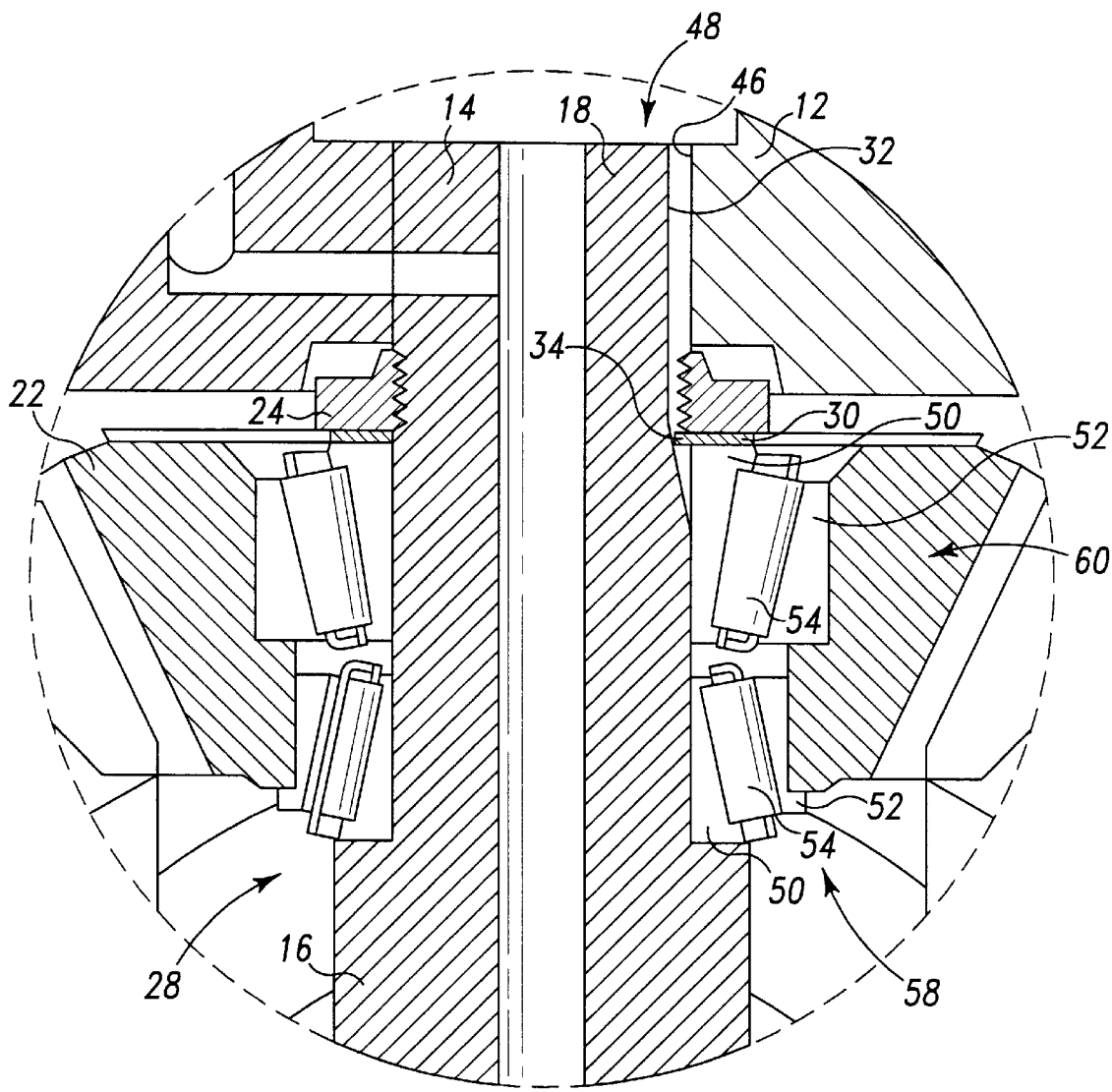
FIG. 3 is an enlarged view of a portion of FIG. 1 which is encircled and indicated as FIG. 3.

Washer 30 has a tab 34 extending from an inner peripheral edge 36 thereof. Washer 30 is positioned relative to spider structure 14 such that washer 30 is disposed around spider shaft 18 and positioned in contact with inner bearing member 50 of distal bearing assembly 60. In addition, washer 30 is further positioned relative to spider shaft 18 such that tab 34 extends into slot 32 as shown in FIG. 3. It should be appreciated that each spider shaft 18 has a washer 30 disposed therearound in the above described manner.

Each fastener 24 has a threaded portion 26 defined on an inner peripheral surface 40 thereof. One fastener 24 is positioned relative to each spider shaft 18 such that threaded portion 26 of the fastener 24 cooperates with threaded portion 20 of the spider shaft 18 thereby securing one fastener 24 to each spider shaft 18. It should be appreciated that positioning fasteners 24 in the above described manner (i) interposes each bearing assembly 28 between a fastener 24 and spider hub 16 and (ii) interposes each washer 30 between a fastener 24 and a bearing assembly 28 as shown in FIG. 3.

Referring now to FIG. 3, one pinion gear 22 is disposed around each spider shaft 18 so that pinion gear 22 is in contact with proximal bearing assembly 58 and distal bearing assembly 60. Positioning each pinion gear 22 in the aforementioned manner interposes each bearing assembly 28 between a pinion gear 22 and a spider shaft 18.

As shown in FIG. 1, when differential assembly 10 is fully assembled spider structure 14 is positioned within differential housing 12 such that spider structure 14 is interposed between side gears 42. In addition, spider structure 14 is positioned within differential housing 12 such that an end portion 48 of each spider shaft 18 is received within each housing aperture 46 (see also FIG. 3). Locating spider structure 14 in the above described manner interposes fastener 24 between differential housing 12 and bearing assembly 28 as shown in FIG. 3. Furthermore, locating spider structure 14 in the above described manner locates each pinion gear 22 relative to a side gear 42 such that each pinion gear 22 meshingly engages with a side gear 42 in an appropriate manner.

INDUSTRIAL APPLICABILITY

It should be appreciated that having each bearing assembly 28 secured to spider shaft 18 such that bearing assembly 28 is in direct contact with spider shaft 18 is an important aspect of the present invention and represents an advantage over other differential assembly designs. Specifically, other differential assembly designs interpose a component, such as a sleeve, between the bearing assembly and the spider shaft. It should be understood that there is a limited amount of space available in the interior cavity of a differential housing. As a result, the more components placed in the interior cavity the smaller each component must be. For example, the above described arrangement requires the spider shaft of the spider structure to have a smaller circumference so the interior cavity is able to accommodate the additional space taken up by the sleeve. Having a smaller spider shaft decreases the structural strength thereof, and thus makes the spider shaft more susceptible to cracking under the loads it is subjected to during the use of the differential assembly. Having a spider shaft which is more susceptible to cracking increases the maintenance cost for the differential assembly.

The above described differential assembly design is in contrast to the present invention which mounts bearing assembly 28 directly to spider shaft 18 with fastener 24. That is, bearing assembly 28 is in direct contact with spider shaft 18. Therefore, the aforementioned sleeve is eliminated, and no component is interposed between spider shaft 18 and bearing assembly 28. Eliminating the sleeve allows spider shaft 18 to have a larger circumference while still being able to fit within interior cavity 62. Increasing the circumference of spider shaft 18 increases the structural strength thereof and thus inhibits cracking. Inhibiting cracking decreases the maintenance cost of differential assembly 10 as compared to differential assemblies which interpose a component between the bearing assembly and the spider shaft.

An additional problem with a differential assembly design that interposes a sleeve between the bearing assembly and the spider shaft is that the position of the pinion gear relative to the side gear is determined by a relatively large number of mechanically coupled parts. For example, the positioning of the pinion gear relative to the side gear is determined to some degree by each of the following components; the differential housing, the spider structure, the roller bearing assembly, and the sleeve. As a result, the tolerances of each of the aforementioned components must be carefully controlled in order for the pinion gear to be positioned properly. Having to carefully control the tolerances of the aforementioned components increases the manufacturing cost of the differential assembly.

As discussed above, the present invention eliminates any component being interposed between bearing assembly 28 and spider shaft 18. Therefore, the positioning of a pinion gear 22 relative to a side gear 42 is determined by a fewer number of components. Specifically, in the present invention, pinion gears 22 are positioned relative to side gears 42 via only differential housing 12, spider structure 14, and bearing assembly 28. As a result, less tolerance stack-up is created which decreases the manufacturing costs of differential assembly 10 as compared to differential assemblies which interpose a component between the bearing assembly and the spider shaft.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A differential assembly, comprising:
   a differential housing;
   a spider structure positioned within said differential housing, wherein (i) said spider structure has a spider hub and a spider shaft, (ii) said spider shaft extends from said spider hub, and (iii) said spider shaft has a first threaded portion formed therein;
   a pinion gear positioned around said spider shaft;
   a side gear which meshingly engages said pinion gear;
   a fastener having a second threaded portion which cooperates with said first threaded portion of said spider shaft so as to secure said fastener to said spider shaft; and
   a bearing assembly which is (i) interposed between said pinion gear and said spider shaft, and (ii) interposed between said fastener and said spider hub,
      wherein (i) said differential housing includes a housing aperture, and (ii) an end portion of said spider shaft is received within said housing aperture; and
      wherein said fastener is positioned within said differential housing.

2. The assembly of claim 1, wherein said bearing assembly is positioned in contact with said spider shaft.

3. The assembly of claim 1, further comprising a washer positioned around said spider shaft, wherein:
   said spider shaft has a slot defined therein,
   said washer has a tab extending from an inner peripheral edge thereof, and
   said tab extends into said slot when said washer is positioned around said spider shaft.

4. The assembly of claim 3, wherein said washer is interposed between said fastener and said bearing assembly.

5. The assembly of claim 1, wherein:
   said first threaded portion is defined on an outer surface of said spider shaft, and
   said second threaded portion is defined on an inner peripheral surface of said fastener.

6. The assembly of claim 1, further comprising:
   a wheel axle mechanically coupled to said side gear.

7. The assembly of claim 1, wherein said fastener is interposed between said differential housing and said bearing assembly.

8. The assembly of claim 1, wherein said bearing assembly includes:
   an inner bearing member,
   an outer bearing member, and
   a plurality of rollers interposed between said inner bearing member and said outer bearing member.

9. A differential assembly, comprising:
   a differential housing;
   a spider structure positioned within said differential housing, said spider structure has (i) a spider hub, and (ii) a spider shaft which extends from said spider hub, and said spider shaft has a first threaded portion defined thereon;
   a pinion gear positioned around said spider shaft;
   a fastener having a second threaded portion which cooperates with said first threaded portion of said spider shaft so as to secure said fastener to said spider shaft; and
   a bearing assembly which directly contacts said spider shaft, wherein said bearing assembly is (i) interposed between said pinion gear and said spider shaft, and (ii) interposed between said fastener and said spider hub,
      wherein (i) said differential housing includes a housing aperture, and (ii) an end portion of said spider shaft is received within said housing aperture; and
      wherein said fastener is positioned within said differential housing.

10. The assembly of claim 9, further comprising a washer positioned around said spider shaft, wherein:
    said spider shaft has a slot defined therein,
    said washer has a tab extending from an inner peripheral edge thereof, and
    said tab extends into said slot when said washer is positioned around said spider shaft.

11. The assembly of claim 10, wherein said washer is interposed between said fastener and said bearing assembly.

12. The assembly of claim 9, wherein:
    said first threaded portion is defined on an outer surface of said spider shaft, and
    said second threaded portion is defined on an inner peripheral surface of said fastener.

13. The assembly of claim 9, further comprising:
    a side gear which meshingly engages said pinion gear; and
    a wheel axle mechanically coupled to said side gear.

14. The assembly of claim 9, wherein said fastener is interposed between said differential housing and said bearing assembly.

15. The assembly of claim 9, wherein said bearing assembly includes:
    an inner bearing member,
    an outer bearing member, and
    a plurality of rollers interposed between said inner bearing member and said outer bearing member.

* * * * *